US012664811B2

(12) United States Patent
Higashiyama et al.

(10) Patent No.: US 12,664,811 B2
(45) Date of Patent: Jun. 23, 2026

(54) INFORMATION PROCESSING APPARATUS AND IMAGE READING APPARATUS JUDGING TITLE OF READ DOCUMENT

(71) Applicant: KYOCERA Document Solutions Inc., Osaka (JP)

(72) Inventors: Naomichi Higashiyama, Osaka (JP); Kunihiko Tanaka, Osaka (JP); Kota Kamisono, Osaka (JP); Noa Kaneda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 220 days.

(21) Appl. No.: 18/770,714

(22) Filed: Jul. 12, 2024

(65) Prior Publication Data

US 2025/0029416 A1      Jan. 23, 2025

(30) Foreign Application Priority Data

Jul. 21, 2023      (JP) ................................. 2023-119492

(51) Int. Cl.
| | |
|---|---|
| *G06V 30/414* | (2022.01) |
| *G06V 10/44* | (2022.01) |
| *G06V 20/70* | (2022.01) |
| *G06V 30/10* | (2022.01) |

(52) U.S. Cl.
CPC ............ *G06V 30/414* (2022.01); *G06V 10/44* (2022.01); *G06V 20/70* (2022.01); *G06V 30/10* (2022.01)

(58) Field of Classification Search
USPC ................................. 382/155, 159, 181, 229
See application file for complete search history.

(56) References Cited

U.S. PATENT DOCUMENTS

| | | | | |
|---|---|---|---|---|
| 6,567,546 B1 * | 5/2003 | Eguchi | ................. | G06V 30/412 |
| | | | | 345/689 |
| 7,099,507 B2 * | 8/2006 | Ouchi | ................. | G06V 30/416 |
| | | | | 382/176 |
| 8,707,167 B2 * | 4/2014 | Grandhi | ................ | G06F 40/103 |
| | | | | 715/201 |
| 8,891,871 B2 * | 11/2014 | Eguchi | ............... | G06V 30/1444 |
| | | | | 382/173 |

(Continued)

FOREIGN PATENT DOCUMENTS

| | | |
|---|---|---|
| JP | 2021033831 A | 3/2021 |
| JP | 2021179747 A | 11/2021 |

*Primary Examiner* — Ishrat I Sherali

(74) *Attorney, Agent, or Firm* — IP Business Solutions, LLC.

(57) ABSTRACT

In an image reading apparatus, a character area extractor extracts character areas from a document image in units of rows. A title reliability calculator calculates a title reliability level of each character area using a feature quantity data set and a machine learning model. A character recognizer converts character areas of which title reliability levels exceed a threshold into text data. A title judger collates text data with a title candidate. In a case in which one piece of text data coinciding with a title candidate is judged and detected, the title judger sets the text data as a title of the document image. In a case in which a plurality of pieces of coinciding text data are judged and detected, the title judger sets text data of which a title reliability level is the highest among the detected pieces of text data as a title of the document image.

8 Claims, 6 Drawing Sheets

(56)     References Cited

U.S. PATENT DOCUMENTS

| | | | |
|---|---|---|---|
| 11,321,936 B2* | 5/2022 | Kondoh ............... | G06V 30/268 |
| 11,328,504 B2* | 5/2022 | Nakatani .............. | G06V 30/412 |
| 11,657,367 B2* | 5/2023 | Iwase ..................... | G06F 18/22 |
| | | | 382/159 |
| 11,676,409 B2* | /2023 | Kashimoto .......... | G06V 10/776 |
| | | | 382/161 |
| 12,355,927 B2* | 7/2025 | Kosaka ................ | G06V 30/416 |
| 2021/0064863 A1 | 3/2021 | Iwase | |
| 2021/0357632 A1 | 11/2021 | Kashimoto | |
| 2026/0072975 A1* | 3/2026 | Abbe ...................... | G06F 16/35 |

* cited by examiner

Fig.4

INVOICE

ABC CO., LTD.    ~ 9

PERSON IN CHARGE    JIRO JITSUYO
INVOICE NO.    NO. 12345
INVOICE DATE    JAN. 1, 2023

XYZ CO., LTD.
〒000-0000
AA 1-1-1, BB WARD, TOKYO
ACCOUNTING STAFF
TARO TOKKYO

| No. | ITEM | QUANTITY | UNIT PRICE | AMOUNT |
|---|---|---|---|---|
| 1 | DESIGN TYPE | 10 | ¥50,000 | ¥500,000 |
| 2 | PRODUCTION OF BANNER | 5 | ¥60,000 | ¥300,000 |
| 3 | | | | |
| 4 | | | | |
| 5 | | | | |
| 6 | | | | |
| 7 | | | | |

| | | |
|---|---|---|
| SUBTOTAL | | ¥800,000 |
| CONSUMPTION TAX | | ¥80,000 |
| TOTAL | | ¥880,000 |

<TRANSFER BANK ACCOUNT>
AA BANK BB BRANCH
REGULAR ACCOUNT NO. 1234567

Fig.5

INFORMATION PROCESSING APPARATUS AND IMAGE READING APPARATUS JUDGING TITLE OF READ DOCUMENT

INCORPORATION BY REFERENCE

This application claims priority to Japanese Patent Application No. 2023-119492 filed on Jul. 21, 2023, the entire contents of which are incorporated by reference herein.

BACKGROUND

The present disclosure relates to an information processing apparatus and an image reading apparatus that judges a title by reading a document and performing character recognition.

The number of chances for scanning an atypical document such as slip to form data using a scanner and storing and using the data has increased. In addition, data is transmitted to an electronic terminal used by a user, and the user checks or classifies the data using the electronic terminal.

However, in a case in which a plurality of documents are continuously scanned, there are problems that originally-separate documents are converted into data as a single image, and that an actually-continuous document is classified into a different image for each page. In order to solve these problems, there is a method in which a white sheet is inserted inside of each document as a cover sheet, and a scanner reads this cover sheet to automatically classify documents. However, the labor of inserting a white sheet inside a document is necessary.

Thus, a classification method in which feature quantities such as a size, a color, and a keyword of a character part inside a document are extracted, and scanned data is classified using machine learning has been proposed. In addition, a technique for acquiring probabilities of attributes in a character part for acquiring each item of the inside of a slip and a numerical value thereof while being accurately associated with each other has been proposed as well.

SUMMARY

As one aspect of the present disclosure, a technique acquired by further improving the technique described above is proposed.

An information processing apparatus according to one aspect of the present disclosure includes a control device. The control device includes a processor and, by the processor executing a control program, functions as a character area extractor, a feature quantity calculator, a machine learning processor, title a reliability calculator, a character recognizer, a title candidate storage device, and a title judger. The character area extractor extracts character areas from a document image acquired by reading a document in units of rows and acquires position information of each of the extracted character areas. The feature quantity calculator calculates a feature quantity of a character area using the position information of the character area and information of the document image. The machine learning processor generates a feature quantity data set configured using the feature quantities of the character areas and generates a machine learning model by performing machine learning of title judgment. The title reliability calculator calculates a title reliability level representing a possibility of inclusion of a title in a character area for each character area on the basis of the feature quantity data set and the machine learning model. The character recognizer performs character recognition of the character area having a title reliability level exceeding a threshold set in advance to convert the character area into text data. The title candidate storage device is configured to store character strings that are title candidates. The title judger detects text data in which a character string stored by the title candidate storage device is included among text data converted by the character recognizer and judges the detected text data as a title of the document.

An image reading apparatus according to one aspect of the present disclosure includes: an information processing apparatus according to one aspect of the present disclosure; and an image reading device. The image reading device acquires a document image by reading a document.

BRIEF DESCRIPTION OF THE DRAWINGS

FIG. 4 is a diagram illustrating one example of a document image.

FIG. 5 is a diagram illustrating one example of a document image.

DETAILED DESCRIPTION

Figure 1:
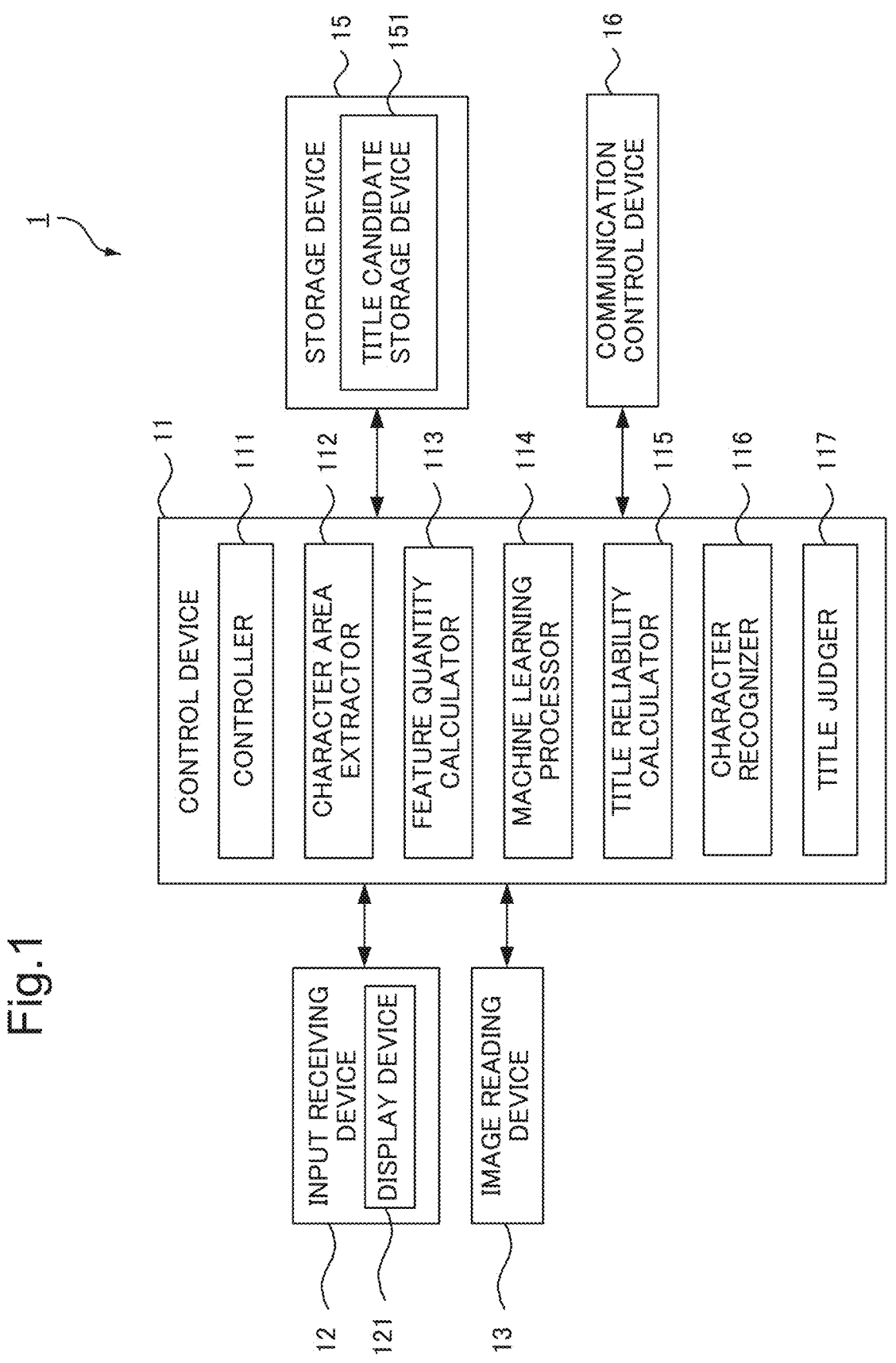
FIG. 1 is a diagram illustrating an electric configuration of an image reading apparatus.

Hereinafter, an information processing apparatus and an image reading apparatus according to one embodiment of the present disclosure will be described with reference to the drawings. In addition, in this embodiment, an image reading apparatus including an information processing apparatus according to the present disclosure will be described as an example. FIG. 1 is a diagram illustrating an electric configuration of an image reading apparatus according to one embodiment of the present disclosure. Hereinafter, although there are cases in which left, right, upward, and downward directions are represented, these represent directions as one example in each drawing unless otherwise mentioned.

The image reading apparatus 1 is configured to include a control device 11, an input receiving device 12, an image reading device 13, a storage device 15, a communication control device 16, and the like. The input receiving device 12 includes hard keys such as a select key for performing various operations and an operation of determining setting, a start key, and the like, and a display device 121. The display device 121 displays an operation screen, a message, and the like and is configured integrally with a touch panel.

The image reading device 13 includes a scanner and the like and reads an image of a document to acquire a document image. The communication control device 16 is configured using a communication module and the like and transmits/receives various kinds of data to/from an external apparatus through a network.

The storage device 15 is a storage device with a large capacity that is configured using an SSD or an HDD storing image data, various kinds of programs, a data table, and the like. The storage device 15 includes a title candidate storage device 151 as a part of a storage area thereof. The title candidate storage device 151 is a database storing character strings that are titles of documents in advance.

The control device 11 is configured using a processor, a random access memory (RAM), a read only memory (ROM), and the like. The processor is a central processing unit (CPU), a micro processing unit (MPU), an application specific integrated circuit (ASIC), or the like. By a processor executing a control program stored in a ROM or the like, the control device 11 functions as a controller 111, a character area extractor 112, a feature quantity calculator 113, a machine learning processor 114, a title reliability calculator 115, a character recognizer 116, and a title judger 117. In addition, each of the above-described parts of the control device 11 may be configured using a hardware circuit instead of an operation based on a control program.

The controller 111 is responsible for overall operation control of the image reading apparatus 1. The character area extractor 112 recognizes characters from a document image read by the image reading device 13, for example, using an optical character recognition processing technique, further extracts a character area in units of rows, and acquires position information of the extracted character area. More specifically, the character area extractor 112 extracts a character area in units of rows from a document image and acquires coordinates of four places (a left-end uppermost position, a right-end uppermost position, a left-end lowermost position, and a right-end lowermost position) of each extracted character area as position information.

The feature quantity calculator 113 calculates a feature quantity of a character area using position information of a character area and information of a document image acquired by the character area extractor 112. The information of a document image is vertical/horizontal lengths, an aspect ratio, a resolution, and the like of the document image. A feature quantity of a character area includes a length in the vertical direction, a length in the horizontal direction, center coordinates, an aspect ratio, an area, and the like. The feature quantity calculator 113 uses information of a document image at the time of calculating a feature quantity of a character area, thereby scaling (normalizing) the feature quantity of each character area.

The coordinates representing a position of a character area may be a value representing a relative positional relation with respect to the length of a document image in the vertical direction and the length thereof in the horizontal direction. For example, in an area of a document image, in a case in which coordinates of a left-end uppermost position are represented as (0, 0), and coordinates of a right-end lowermost position are represented as (1, 1), each of coordinates representing a position of a character area are ($0 \leq x \leq 1$), ($0 \leq y \leq 1$) (here, x is a coordinate in the horizontal direction, and y is a coordinate in the vertical direction).

The machine learning processor 114 generates a machine learning model that uses a feature quantity of a character area calculated by the feature quantity calculator 113 as a data set used for judging a title. The title reliability calculator 115 calculates a title reliability level representing the possibility of inclusion of a title in a character area for each character area on the basis of a feature quantity of the character area and a machine learning model.

The character recognizer 116, for example, performs character recognition of a character area using optical character recognition (OCR) processing and converts the character area into text data. The title judger 117 detects a title from text data converted by the character recognizer 116 using title candidates stored by the title candidate storage device 151.

Figure 2:
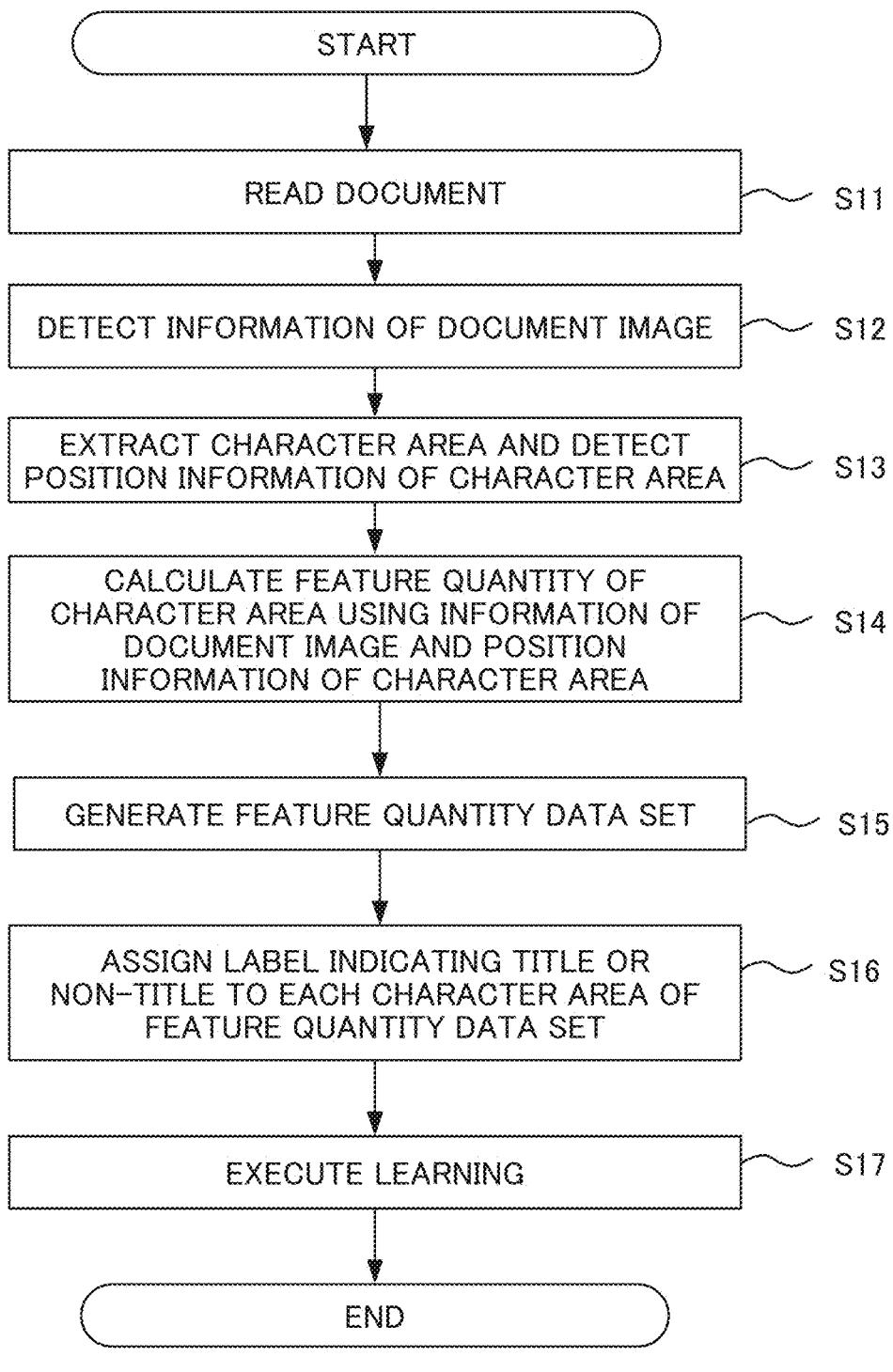
FIG. 2 is a flowchart illustrating the flow of a process of generating a machine learning model.

Next, the process of generating a machine learning model will be described. FIG. 2 is a flowchart illustrating the flow of the process of generating a machine learning model. First, the image reading device 13 acquires a document image by reading a document (S11). The feature quantity calculator 113 detects information of vertical and horizontal lengths of a document image, an aspect ratio, a resolution, and the like (S12). In addition, the character area extractor 112 extracts a character area in units of rows from a document image using an optical character recognition technique and acquires position information (coordinates of four places (a left-end uppermost position, a right-end uppermost position, a left-end lowermost position, and a right-end lowermost position)) of each character area (S13).

Then, the feature quantity calculator 113 calculates a feature quantity (a length in the vertical direction, a length in the horizontal direction, center coordinates, an aspect ratio, an area, and the like) of each character area using information of a document image and position information of the character area (S14), and the machine learning processor 114 generates a feature quantity data set (S15). In addition, the machine learning processor 114 assigns a label indicating a title or a non-title to each character area of the feature quantity data set (S16).

More specifically, the display device 121 displays an image of each character area, and a user (a supervisor) inputs whether or not a title is present in an image of the displayed character area to the input receiving device 12. On the basis of details received by the input receiving device 12, the machine learning processor 114 assigns a label "1" to a character area including a title and assigns a label "0" to a character area not including a title for character areas of a feature quantity data set.

In addition, in a case in which it is assumed that one title is present in one document image (there is one character area including a title), when a user designates a character area including a title, the machine learning processor 114 may be configured to automatically assign the label "0" to the other character areas.

Furthermore, in a case in which a title is divided into two rows or more, a user assigns the label "1" to a character area including a keyword that can be recognized as a title the most easily or assigns the label "1" to both two rows. In addition, the method of assigning a label is not limited thereto. Furthermore, a document image not including a title may be used in machine learning.

Next, the machine learning processor 114 generates a machine learning model using a machine learning algorithm by using a feature quantity data set to which the label has been assigned in Process S16 (S17). The machine learning algorithm used here is not particularly limited, and a machine learning algorithm that is arbitrarily selected by a learning execution staff can be used. In addition, feature quantities used in learning and reasoning among feature quantities (a length in the vertical direction, a length in the horizontal direction, center coordinates, and the like) of a feature quantity data set are also not limited thereto and can be arbitrarily selected and used by a learning execution staff. In order to decrease the probability of missing a character area that is a title without limit as a criterion of learning accuracy, it is preferable to generate a machine learning model such that a correct answer rate (a reproduction rate) of judgment of a title in a title judging process to be described below is near 100%.

Figure 3:
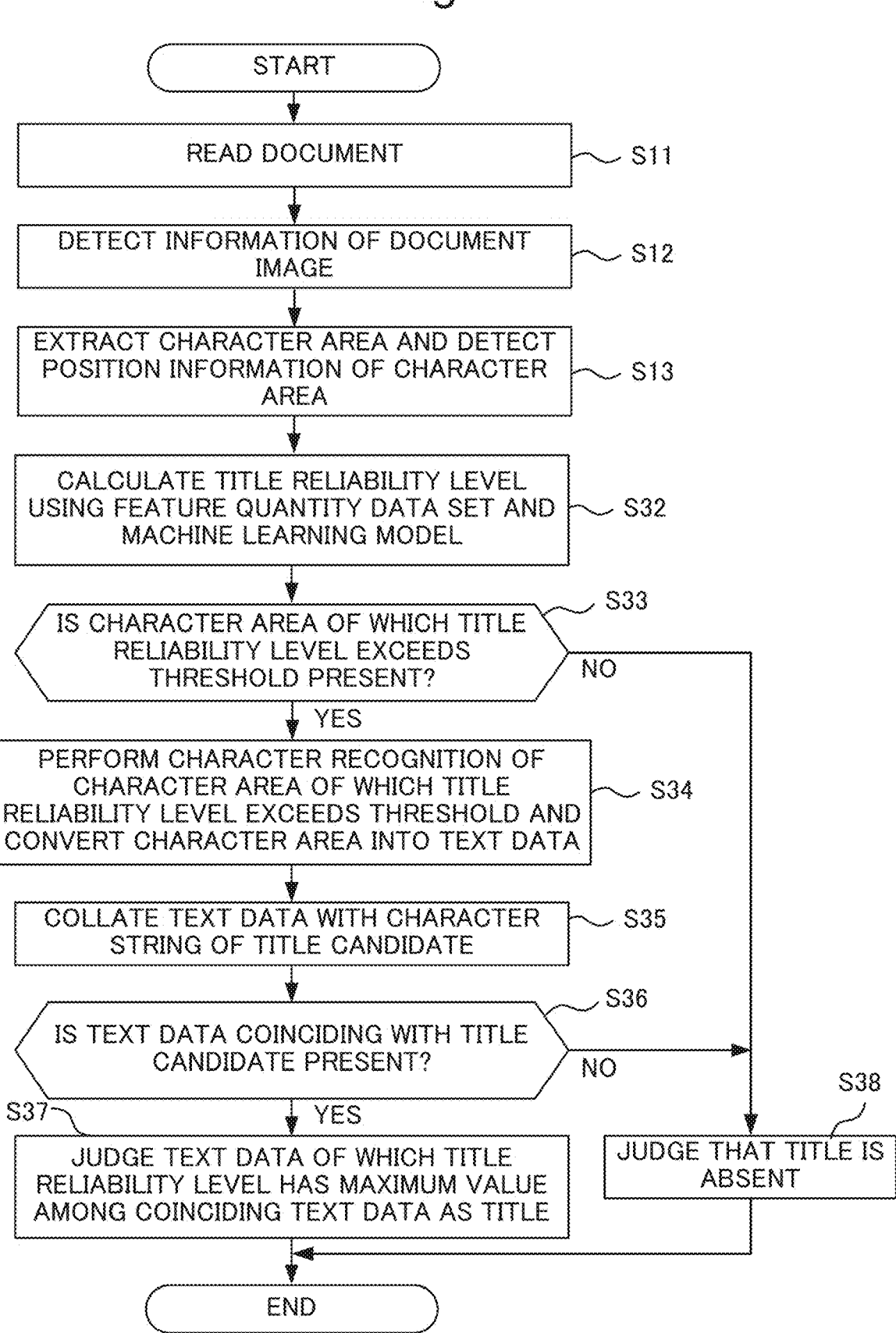
FIG. 3 is a flowchart illustrating the flow of a title judging process.
Figure 5:
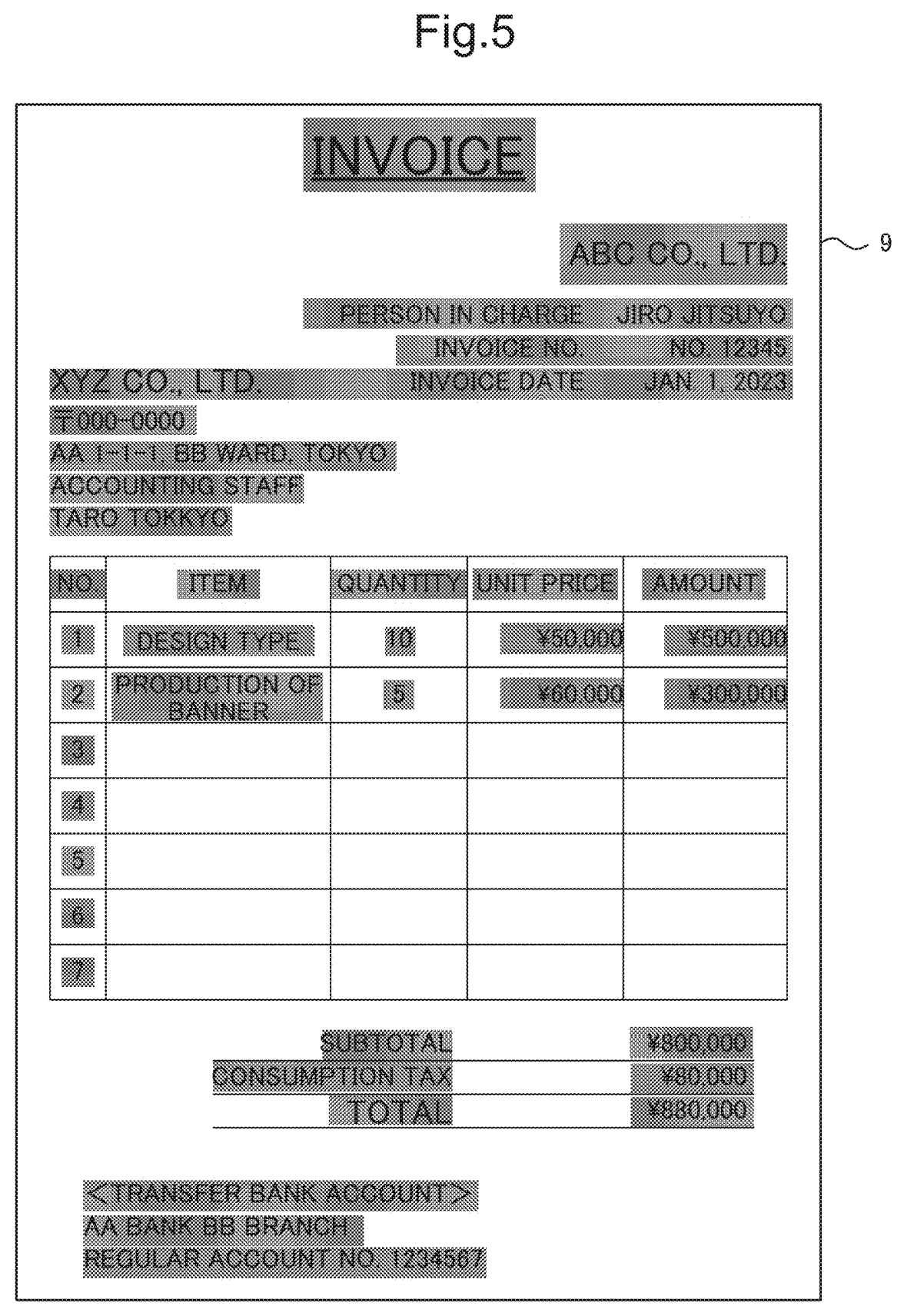

Next, a title judging process will be described. FIG. 3 is a flowchart illustrating the flow of the title judging process. Processes S11 to S13 are the same as the process of generating a machine learning model described with reference to FIG. 2, and thus detailed description thereof will be omitted. FIG. 4 is a diagram illustrating one example of the document image 9. The character area extractor 112 extracts a character area in units of rows using an optical character recognition technique from this document image 9. FIG. 5 is a diagram illustrating a character area extracted from the document image 9 by the character area extractor 112, and a part indicated by a mesh is a character area.

The title reliability calculator 115 calculates a title reliability level of each character area using a feature quantity data set generated using the machine learning model generating process and the machine learning model (S32). A title reliability level is a numerical value representing a possibility that a title is included. The higher the title reliability level, the higher the possibility that a title is included.

Figure 6:
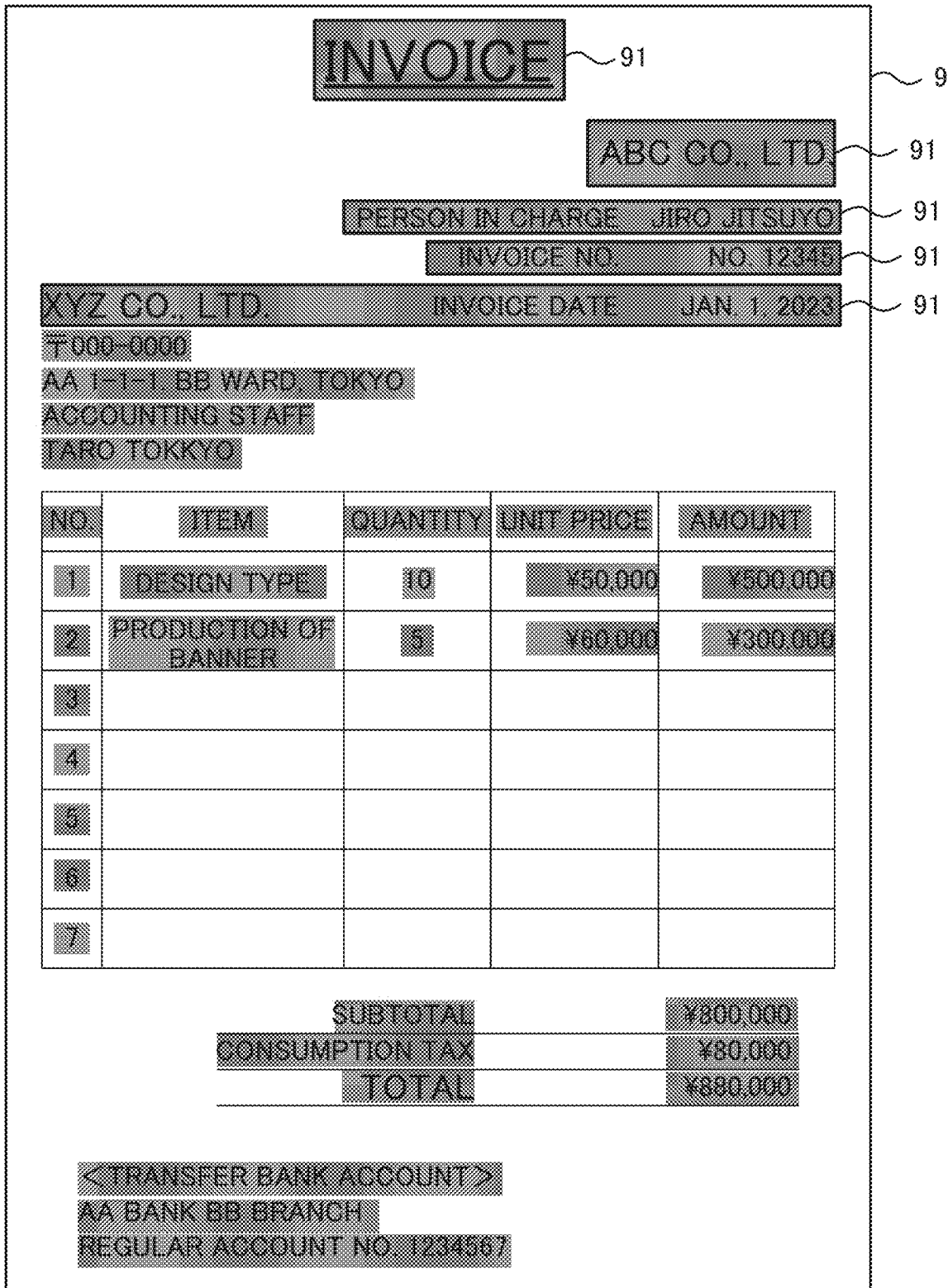
FIG. 6 is a diagram illustrating one example of a document image.

Subsequently, the controller 111 judges whether or not a character area of which a title reliability level exceeds a threshold set in advance is present (S33). In a case in which a character area of which a title reliability level exceeds the threshold is present (S33: Yes), the character recognizer 116 performs optical character recognition of the character area and converts the character area into text data (S34). For example, as illustrated in FIG. 6, the controller 111 judges that a character area 91 enclosed by a frame line is an area of which a title reliability level exceeds the threshold. Then, the character recognizer 116 converts only the character area 91 into text data using an optical character recognition technique. In accordance with this, the processing time can be reduced to be shorter than that of a case in which all the character areas are converted into text data, and the processing load can be reduced.

Then, the title judger 117 collates text data with each of title candidates stored by the title candidate storage device 151 (S35). In a case in which one pieces of text data coinciding with a title candidate is judged and detected (S36: Yes), the title judger 117 sets the text data as a title of the document image (S37). Thereafter, the process ends.

In a case in which a plurality of pieces of coinciding text data are judged and detected (S36: Yes), the title judger 117 sets text data of which a title reliability level is the highest among the detected pieces of text data as a title of the document image (S37). Thereafter, the process ends.

On the other hand, in a case in which the controller 111 judges that a character area of which a title reliability level exceeds the threshold is absent in Process S33 (S33: No) or in a case in which the title judger 117 judges that text data coinciding with a title candidate stored by the title candidate storage device 151 is absent in Process S36 (S36: No), the title judger 117 judges that a title is absent in the document image (S38). Thereafter, the process ends.

As described above, the character area extractor 112 extracts character areas from a document image in units of rows and converts only character areas of which title reliability levels calculated for the character areas by the title reliability calculator 115 exceed the threshold into text data by the character recognizer 116. Accordingly, the processing time can be reduced to be shorter than that of a case in which all the character areas included in the document image are converted into text data, and a time required for title judgment can be reduced as well, whereby the processing load can be reduced.

In addition, also when the title judger 117 detects a title, text data of not all the character areas included in a document image but character areas of which title reliability levels exceed the threshold is set as a search target, and thus the search targets are narrowed down, whereby the accuracy of title judgment can be improved.

Furthermore, when a plurality of types of documents are included in document images acquired by reading a plurality of the document images using the image reading device 13, and document classification is performed on the basis of titles judged by the title judger 117, a time required for title judgment is shortened, and the classification processing time for document images can be shortened as well.

Here, in the case of the above-described classification method described in BACKGROUND, when a scanned image is a grayscale, there is a problem that it is difficult for a difference between colors of character parts to appear. In addition, character recognition is performed for all character parts as targets, and it is judged whether or not keywords for classification are included thereby, and thus the efficiency becomes low. Furthermore, in the above-described technique described in BACKGROUND, although position information of a character part is used as a feature quantity, and other feature quantities such as a size and a length are not used and utilized for document classification. In contrast to this, according to the embodiment described above, a title can be efficiently judged from a character area included in a document image.

While the present disclosure has been described in detail with reference to the embodiments thereof, it would be apparent to those skilled in the art that the various changes and modifications may be made therein within the scope defined by the appended claims.

What is claimed is:

1. An information processing apparatus comprising a controller that includes a processor and, by the processor executing a control program, functions as:

a character area extractor configured to extract character areas from a document image acquired by reading a document in units of rows and acquire position information of each of the extracted character areas;

a feature quantity calculator configured to calculate a feature quantity of a character area using the position information of the character area and information of the document image;

a machine learning processor configured to generate a feature quantity data set configured using the feature quantities of the character areas and generate a machine learning model by performing machine learning of title judgment;

a title reliability calculator configured to calculate a title reliability level representing a possibility of inclusion of a title in a character area for each character area on the basis of the feature quantity data set and the machine learning model;

a character recognizer configured to perform character recognition of a character area having the title reliability level exceeding a threshold set in advance to convert the character area into text data;

a title candidate storage device configured to store character strings that are title candidates; and a title judger configured to detect text data in which a character string stored by the title candidate storage device is included among text data converted by the character recognizer and judge the detected text data as a title of the document.

2. The information processing apparatus according to claim 1, wherein, in a case in which a plurality of pieces of text data including a character string stored by the title candidate storage device are judged, the title judger judges the text data of the character area having the highest title reliability level among the character areas represented by the text data as a title of the document.

3. The information processing apparatus according to claim 1, wherein, in a case in which the character recognizer judges that the character area having a title reliability level exceeding the threshold set in advance is absent or in a case in which the title judger judges that text data in which a character string stored by the title candidate storage device is included is absent in the text data converted by the character recognizer, the title judger judges that a title is not present in the document image.

4. The information processing apparatus according to claim 1, further comprising an input receiving device configured to receive an operation input, wherein the input receiving device receives an input indicating whether or not a title is included in each character area included in the feature quantity data set, and wherein the machine learning processor assigns a label indicating whether or not a title is included to each of the character areas of the feature quantity data set on the basis of details received by the input receiving device.

5. The information processing apparatus according to claim 1, wherein, when a label indicating that a title is included is assigned to one character area among the character areas, the machine learning processor assigns a label indicating that a title is included to this one character area and assigns a label indicating that no title is included to each of the character areas other than this one character area.

6. The information processing apparatus according to claim 1, wherein the feature quantity of the character area is determined using center coordinates of the character area in the document image and numerical values including a vertical length and a horizontal length of the character area.

7. The information processing apparatus according to claim 1, wherein the information of the document image is determined using numerical values including a vertical length and a horizontal length of the document image.

8. An image reading apparatus comprising:

the information processing apparatus according to claim 1; and an image reading device configured to acquire a document image by reading a document.

\*   \*   \*   \*   \*